United States Patent
Jota Costa

(10) Patent No.: US 10,620,739 B2
(45) Date of Patent: Apr. 14, 2020

(54) ELECTROTACTILE FEEDBACK IN MULTITOUCH SYSTEMS

(71) Applicant: Tactual Labs Co., New York, NY (US)

(72) Inventor: Ricardo Jorge Jota Costa, Toronto (CA)

(73) Assignee: Tactual Labs Co., New York, NY (US)

( * ) Notice: Subject to any disclaimer, the term of this patent is extended or adjusted under 35 U.S.C. 154(b) by 199 days.

(21) Appl. No.: 15/056,822

(22) Filed: Feb. 29, 2016

(65) Prior Publication Data
US 2017/0024052 A1    Jan. 26, 2017

Related U.S. Application Data

(60) Provisional application No. 62/121,944, filed on Feb. 27, 2015.

(51) Int. Cl.
*G06F 3/041*    (2006.01)
*G06F 3/01*    (2006.01)
*G06F 3/044*    (2006.01)

(52) U.S. Cl.
CPC ............ *G06F 3/0416* (2013.01); *G06F 3/016* (2013.01); *G06F 3/044* (2013.01); *G06F 2203/04101* (2013.01); *G06F 2203/04104* (2013.01); *G06F 2203/04105* (2013.01)

(58) Field of Classification Search
CPC .......... G06F 3/016; G06F 3/044; G06F 3/041; G06F 2203/04101; G06F 2203/04104; G06F 2203/04105
See application file for complete search history.

(56) References Cited

U.S. PATENT DOCUMENTS

| | | | |
|---|---|---|---|
| 2008/0150905 A1 | 6/2008 | Grivna et al. | |
| 2012/0050231 A1* | 3/2012 | Westhues | G06F 3/03545 345/179 |
| 2012/0056841 A1* | 3/2012 | Krenik | G06F 3/0418 345/174 |
| 2012/0287068 A1* | 11/2012 | Colgate | G06F 3/016 345/173 |
| 2013/0307789 A1* | 11/2013 | Karamath | G06F 3/016 345/173 |
| 2014/0125468 A1 | 5/2014 | Makinen et al. | |
| 2014/0146005 A1 | 5/2014 | Hong et al. | |
| 2014/0204034 A1 | 7/2014 | Chang et al. | |

(Continued)

*Primary Examiner* — Peter D McLoone
(74) *Attorney, Agent, or Firm* — Adam Landa

(57) ABSTRACT

Disclosed are a method and corresponding touch sensitive device that detects touch and provides tactile feedback. In an embodiment, the device includes a touch interface having row conductors and column conductors. A first row signal generator transmits a first row signal on a first row conductor. A second row signal generator transmits a second row signal on a second row conductor, the second row signal being orthogonal to the first row signal. A third row signal generator generates an electrotactile discharge signal on at least one of the row conductors. In an embodiment, the electrotactile discharge signal is time multiplexed with at least one of said first row signal or said second row signal. A touch processor identifies a touch event on the touch interface by processing signals present on at least one of the column conductors.

22 Claims, 2 Drawing Sheets

(56) References Cited

U.S. PATENT DOCUMENTS

2014/0225844 A1* 8/2014 Tada ................ G06F 3/016
 345/173
2014/0340351 A1 11/2014 Forlines
2015/0029151 A1* 1/2015 Galambos ............ G06F 3/044
 345/174

* cited by examiner

ELECTROTACTILE FEEDBACK IN MULTITOUCH SYSTEMS

This application is a non-provisional of and claims priority to U.S. Provisional Patent Application No. 62/121,944 filed Feb. 27, 2015, the entire disclosure of which is incorporated herein by reference.

FIELD

The disclosed system and method relate in general to the field of user input, and in particular to user input systems which provide electrotactile feedback.

BACKGROUND

The present invention relates to touch sensors, examples of which are disclosed in U.S. patent application Ser. No. 14/945,083 filed Nov. 18, 2015, the entire disclosure of which is incorporated herein by reference.

Current capacitive touch sensors provide little physical feedback to touch and, instead, rely on visual feedback or vibratory feedback to acknowledge that the user is activating the capacitive display. Indeed, the user's finger still feels the display, but is unaware of when the system senses touch.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

Figure 1:
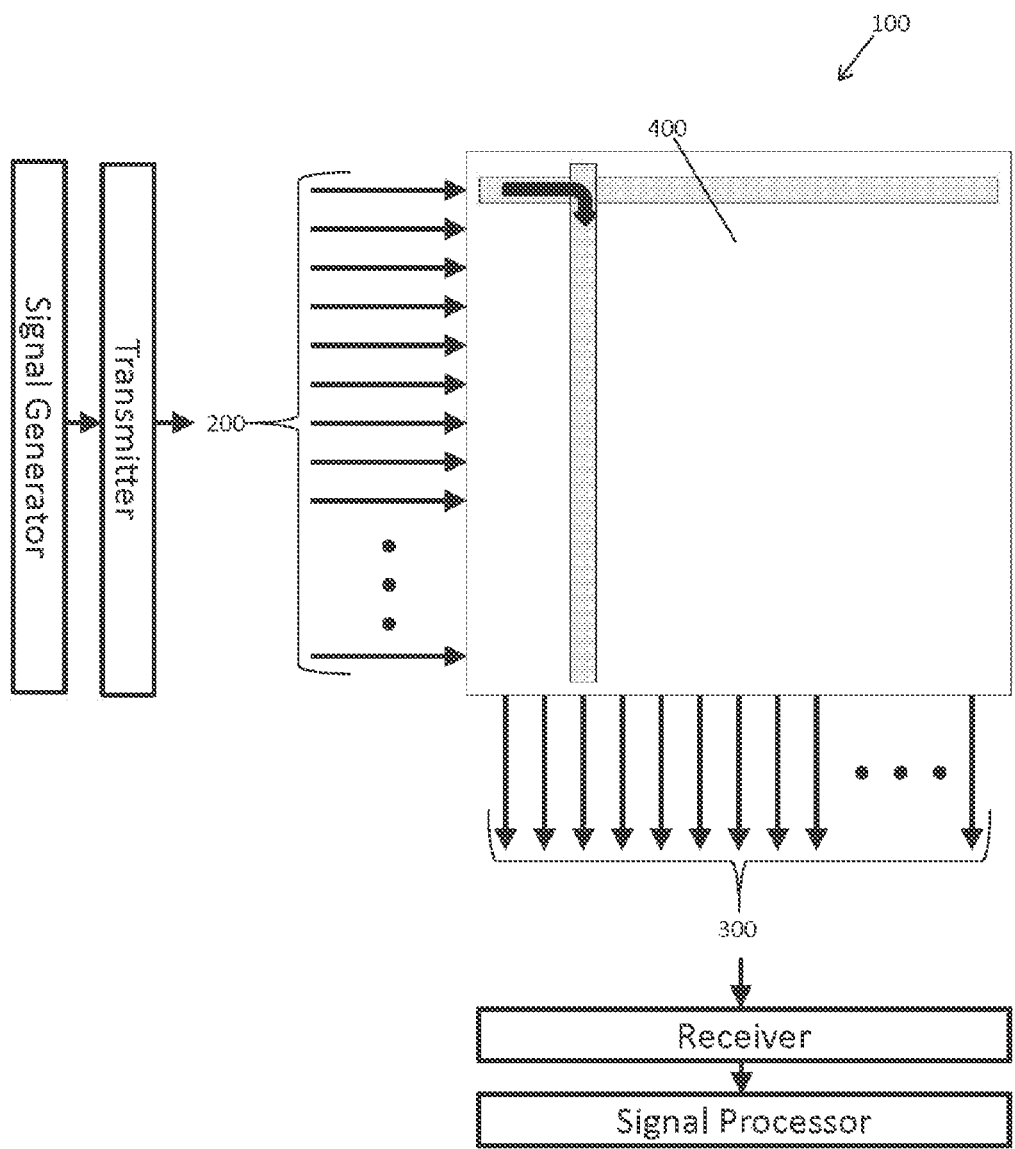
FIG. 1 shows a high level block diagram illustrating an embodiment of a low-latency touch sensor device.
Figure 2:
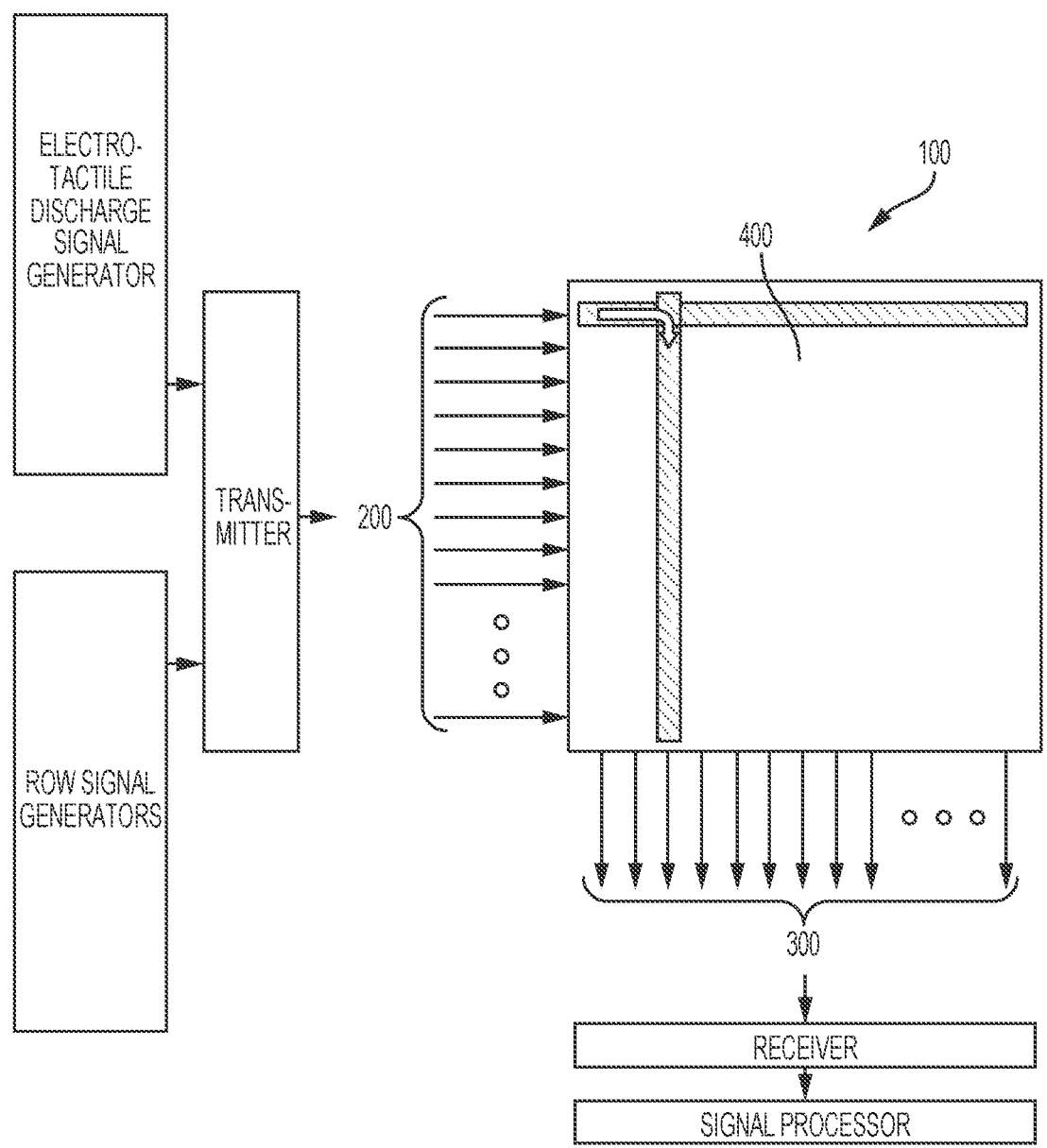
FIG. 2 shows a high level block diagram illustrating an embodiment of a low-latency touch sensor device having a en electrotactile signal generator.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to operational illustrations of methods and devices that provide electrotactile feedback in a touch sensor. It is understood that each step disclosed may be implemented by means of analog or digital hardware and computer program instructions. These computer program instructions may be stored on computer-readable media and provided to a processor of a general purpose computer, special purpose computer, ASIC, Field-Programmable Gate Array (FPGA), or other programmable data processing apparatus, such that the instructions, which execute via the processor of the computer or other programmable data processing apparatus, implements the functions/acts described. In some alternate implementations, the functions/acts described may occur out of the order noted in the operational illustrations. For example, two functions shown in succession may in fact be executed substantially concurrently or the functions may sometimes be executed in the reverse order, depending upon the functionality/acts involved.

Disclosed herein are devices and methods that allow the same sensor that detects capacitive touch to provide tactile feedback by means of electrotactile discharges. Such a sensor is desirable as it allows the user to understand when the system senses his/her touches, and because it allows a system to provide rich touch feedback to individual fingers.

An explanation of electrotactile feedback can be found in IEEE Transactions On Biomedical Engineering, Vol. 38, No. 1, January 1991, *Electrotactile and Vibrotactile Displays for Sensory Substitution Systems*, Kurt A. Kaczmarek, Student Member, IEEE, John G. Webster, Fellow, IEEE, Paul Bach-y-Rita, and Willis J. Tompkins, Senior Member, IEEE.

In a preferred embodiment, the invention utilizes a fast multi-touch sensor, in which unique frequencies are injected on each row in a row/column matrix and each column senses these frequencies whenever a touch bridges the gap between row and column. Such sensors are disclosed, e.g., in U.S. patent application Ser. No. 14/614,295 filed Feb. 4, 2015, the entire disclosure of which is incorporated herein by reference.

The operation of such fast multi-touch sensors will first be described, followed by a more detailed description of the present invention. FIG. 1 illustrates certain principles of a fast multi-touch sensor 100 in accordance with an embodiment. At reference no. 200, a different signal is transmitted into each of the surface's rows. The signals are designed to be "orthogonal", i.e. separable and distinguishable from each other. At reference no. 300, a receiver is attached to each column. The receiver is designed to receive any of the transmitted signals, or an arbitrary combination of them, and to individually measure the quantity of each of the orthogonal transmitted signals present on that column. The touch surface 400 of the sensor comprises a series of rows and columns (not all shown), along which the orthogonal signals can propagate. In an embodiment, the rows and columns are designed so that, when they are not subject to a touch event, a lower or negligible amount of signal is coupled between them, whereas, when they are subject to a touch event, a higher or non-negligible amount of signal is coupled between them. In an embodiment, the opposite could hold as well—having the lesser amount of signal represent a touch event, and the greater amount of signal represent a lack of touch. As discussed above, the touch, or touch event does not require a physical touching, but rather an event that affects the level of coupled signal.

With continued reference to FIG. 1, in an embodiment, generally, the capacitive result of a touch event in the proximity of both a row and column may cause a non-negligible amount of signal present on the row to be coupled to the column. More generally, touch events cause, and thus correspond to, the received signals on the columns. Because the signals on the rows are orthogonal, multiple row signals can be coupled to a column and distinguished by the receiver. Likewise, the signals on each row can be coupled to multiple columns. For each column coupled to a given row, the signals found on the column contain information that will indicate which rows are being touched simultaneously with that column. The quantity of each signal received is generally related to the amount of coupling between the column and the row carrying the corresponding signal, and thus, may indicate a distance of the touching object to the surface, an area of the surface covered by the touch and/or the pressure of the touch.

When a row and column are touched simultaneously, some of the signal that is present on the row is coupled into the corresponding column. (As discussed above, the term touch or touched does not require actual physical contact, but rather, relative proximity.) Indeed, in various implementations of a touch device, physical contact with the rows and/or columns is unlikely as there may be a protective barrier between the rows and/or columns and the finger or other object of touch. Moreover, generally, the rows and columns themselves are not in touch with each other, but rather, placed in a proximity that prevents more than a negligible amount of signal to be coupled there-between. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.)

The nature of the rows and columns is arbitrary and the particular orientation is irrelevant. Indeed, the terms row and column are not intended to refer to a square grid, but rather to a set of conductors upon which signal is transmitted (rows) and a set of conductors onto which signal may be coupled (columns). It is not even necessary that the rows and columns be in a grid at all. Other shapes are possible as long as a touch event will touch part of a "row" and part of a "column", and cause some form of coupling. For example, the "rows" could be in concentric circles and the "columns" could be spokes radiating out from the center. Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. Three or more types of antenna conductors may be used rather than just "rows" and "columns." Many alternative embodiments are possible and will be apparent to a person of skill in the art after considering this disclosure.

As noted above, in an embodiment the touch surface 400 comprises of a series of rows and columns, along which signals can propagate. As discussed above, the rows and columns are designed so that, when they are not being touched, a negligible amount of signal is coupled between them. Moreover, a different signal is transmitted into each of the rows. In an embodiment, each of these different signals are orthogonal (i.e. separable and distinguishable) from one another. When a row and column are touched simultaneously, a non-negligible amount of the signal that is present on the row is coupled into the corresponding column. The quantity of the signal that is coupled onto a column may be related to the pressure or area of touch.

A receiver 300 is attached to each column. The receiver is designed to receive non-negligible amounts of any of the orthogonal signals, or an arbitrary combination of the orthogonal signals, and to identify the columns providing non-negligible amounts of signal. In an embodiment, the receiver may measure the quantity of each of the orthogonal transmitted signals present on that column. In this manner, in addition to identifying the rows in touch with each column, the receiver can provide additional (e.g., qualitative) information concerning the touch. In general, touch events may correspond to the received signals on the columns. For each column, the different signals received thereon indicate which of the corresponding rows is being touched simultaneously with that column. In an embodiment, the non-negligible quantity of each signal received may be related to the amount of coupling between the corresponding row and column and may indicate the area of the surface covered by the touch, the pressure of the touch, etc.

In accordance with an embodiment of the present invention, once finger positions are determined on the touch surface as described above, multiple approaches to haptic feedback can be taken, as described below.

One approach to providing feedback is to time multiplex between generating row signals meant for finger position sensing and signals meant for electrotactile feedback. In its simplest form, this approach would sense position for 1 frame, and then provide feedback for 1 frame, before repeating. Other mixes of sensing and feedback are possible, such as 2-1, 3-1, 3-2 and so on.

Another approach to providing feedback is to interleave signals meant for finger position sensing with signals meant for feedback. These signals have different frequencies and different amplitudes, meaning that they will not interfere with one another. In respect to the sensing of position signals on the columns of the fast multi-touch touch sensor, the relatively low-frequency feedback signals can either be filtered out before processing or ignored after the received column signals are separated into their components.

In an embodiment, the device changes the frequencies, and intensity, of the signal in the columns/rows that are deemed to provide feedback to fingers. Due to the nature of fast multitouch sensors, this can be accomplished in at least three different ways. First, we can specify the specific column/row for one or multiple fingers, allowing finger specific haptics while ignoring other fingers. The sensor can also generate different signals for each column/row thus providing each finger with a separate haptic sensation, i.e., some fingers get a tingling effect while others feel a much stronger feedback. The third way is by mixing two signals, one generated in a specific column and a specific row so as to generate signals that only target a specific (x,y) position, solving the issue of having two fingers in the same row and two fingers in the same column.

The methods and devices described above can be useful in a number of applications. Any visual feedback requires the processing of touch position and the preparation of visual responses. The visual workflow is fundamentally slower that the electrotactile feedback proposed, as it can trigger without the touch information leaving the touch controller. Thus, the electrotactile feedback described herein is a good candidate for on-touch immediate feedback. Applications of the invention also permit a per-finger feedback, significantly improving the user's awareness of when, and what fingers are providing the feedback.

A second application for the methods and devices described above is to provide close to immediate feedback to user interface actions triggered on-touch. For example, a virtual button can be augmented with a haptic feeling to mimic mechanical keyboards key bumps haptics, allowing the user to know when the button is activated. In the same vein, users can merely feel textures, with the possibility of different fingers feeling different textures.

Applications that do not require visual feedback can benefit from use of the methods and devices described above by generating single point haptic feedback. An example is a gamepad or other handheld controller. In an embodiment, such handheld controller provides a curved opaque sensor that can be configured for four or six buttons, according to the game request. The electrotactile would help the user physically feel where the buttons are without the need of a set number of buttons. Similarly, a d-pad (four- or eight-direction digital controller) could be haptically felt and by merely switching the haptic representation the same surface could implement an analog controller that indicates center (resting position) and controller limits. Moreover, the same technique could also replace/augment the existing vibro-motors and provide haptic feedback, to the hand palm, that is not representative of physical controls but, instead, representative of game actions such as big explosions or other events that require the user's attention.

In an embodiment, the processing described herein could be performed on a touch sensor's discrete touch controller. In another embodiment, such analysis and touch processing could be performed on other computer system components such as but not limited to an ASIC, MCU, FPGA, CPU, GPU, SoC, DSP or a dedicated circuit.

Throughout this disclosure, the terms "touch", "touches," or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch" when used as a noun include a near touch and a near touch event, or any other gesture that can be identified using a sensor.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A touch sensitive device that detects touch and provides tactile feedback, comprising:
    touch interface comprising row conductors and column conductors;
    first row signal generator for transmitting a first row signal on a first row conductor;
    second row signal generator for transmitting a second row signal on a second row conductor, the second row signal being frequency orthogonal to the first row signal;
    third row signal generator for generating a first electrotactile discharge signal on at least one of the first and second row conductors, said first electrotactile discharge signal being interleaved with at least one of said first row signal or said second row signal;
    touch processor configured to identify a touch event on the touch interface by processing signals present on at least one of the column conductors; and
    wherein the electrotactile discharge signal is orthogonal in frequency and amplitude to the first row signal and the second row signal.

2. The touch sensitive device according to claim 1, further comprising:
    a fourth row signal generator for generating a second electrotactile discharge signal on at least one of the row conductors.

3. The touch sensitive device according to claim 2, wherein the second electrotactile discharge signal is different than the first electrotactile discharge signal, such that the first electrotactile discharge signal provides a first type of haptic feedback sensation to a user and the second electrotactile discharge signal provides a second type of haptic feedback sensation to the user.

4. The touch sensitive device according to claim 3, wherein the device is configurable such that the first type of haptic feedback sensation is applied to a first finger of the user and the second type of haptic feedback sensation is applied to a second finger of the user.

5. The touch sensitive device according to claim 4, wherein the second type of haptic feedback sensation is stronger than the first type of haptic feedback sensation.

6. The touch sensitive device according to claim 3, wherein the first type of haptic feedback sensation and the second type of haptic feedback sensation together provide a sensation of texture.

7. The touch sensitive device according to claim 3, wherein the first type of haptic feedback sensation and the second type of haptic feedback sensation together provide to the user a sensation of touching a mechanical keyboard or other button.

8. The touch sensitive device according to claim 1, wherein the electrotactile discharge signal is different in amplitude than the first row signal and the second row signal.

9. The touch sensitive device according to claim 1, wherein the electrotactile discharge signal is greater in amplitude than the first row signal and the second row signal.

10. The touch sensitive device according to claim 1, wherein the device is configurable to provide, for a specific column and row, a haptic feedback sensation in response to a touch by a specific finger of a user and no haptic feedback sensation in response to a touch by another finger of the user.

11. The touch sensitive device according to claim 1, wherein the device is configurable to provide, for a first column and row location, a haptic feedback sensation in response to a touch by a user and, for a different column and row location, provide no haptic feedback sensation in response to a touch by the user.

12. The touch sensitive device according to claim 1, wherein the device is configured to trigger the first electrotactile discharge signal in response to a touch to the touch-sensitive device.

13. The touch sensitive device according to claim 1, wherein the device is configured to trigger the first electrotactile discharge signal in response to a touch to a virtual user interface element on a touch screen of the touch-sensitive device.

14. The touch sensitive device according to claim 13, wherein the virtual user interface element is a virtual button.

15. The touch sensitive device according to claim 14, wherein the touch sensitive device is a handheld controller.

16. The touch sensitive device according to claim 14, wherein the touch sensitive device is configured to display multiple virtual buttons.

17. The touch sensitive device according to claim 1, wherein the first, second and third row signal generators are a single generator.

18. A touch sensitive device that detects touch and provides tactile feedback, comprising:
    touch interface comprising row conductors and column conductors;
    first row signal generator for transmitting a first row signal on a first row conductor;
    second row signal generator for transmitting a second row signal on a second row conductor, the second row signal being frequency orthogonal to the first row signal;
    third row signal generator for generating an electrotactile discharge signal on a third row conductor, said electrotactile discharge signal being interleaved with at least one of said first row signal or said second row signal, the electrotactile discharge signal being orthogonal in frequency and amplitude to the first row signal and the second row signal; and,
    touch processor configured to identify a touch event on the touch interface by processing signals present on at least one of the column conductors.

19. A method of sensing touch and providing tactile feedback on a device having a touch interface comprising row conductors and column conductors, the method comprising:
    transmitting a first unique orthogonal row signal on a first row conductor;
    transmitting a second unique orthogonal row signal on a second row conductor, each of the first and second row signals being unique and frequency orthogonal with respect to each other;
    transmitting a first electrotactile discharge signal on at least one of the first and second row conductors, said electrotactile discharge signal being interleaved with at least one of said first row signal or said second row signal, wherein the electrotactile discharge signal is orthogonal in frequency and amplitude to the first row signal and the second row signal;
    detecting column signals present on at least one of the column conductors; and
    identifying a touch event on the touch interface by processing the detected column signals.

20. A method of sensing touch and providing tactile feedback on a device having a touch interface comprising row conductors and column conductors, the method comprising:

transmitting a first unique frequency row signal on a first row conductor;

transmitting a second unique row signal on a second row conductor, each of the first and second row signals being unique with respect to each other;

transmitting a first electrotactile discharge signal on a third row conductor, the electrotactile discharge signal being distinguishable in both frequency and amplitude with respect to the first row signal and the second row signal, said electrotactile discharge signal being interleaved with at least one of said first row signal or said second row signal;

detecting column signals present on at least one of the column conductors; and identifying a touch event on the touch interface by processing the detected column signals.

21. A non-transitory computer readable medium having code for use in identifying touch and providing tactile feedback on a touch sensitive device having row conductors, column conductors and a signals generator, the computer readable medium comprising:

code for causing the signals generator to transmit a first unique frequency orthogonal row signal on at least a first one of the row conductors;

code for causing the signals generator to transmit, concurrently with the transmission of the first unique frequency orthogonal row signal, a second unique orthogonal row signal on a second row conductor;

code for causing the signals generator to transmit a first electrotactile discharge signal on at least one row conductor, said first electrotactile discharge signal being interleaved with at least one of said first row signal or said second row signal, wherein the first electrotactile discharge signal is orthogonal in frequency and amplitude to the first unique frequency orthogonal row signal and the second unique orthogonal row signal;

code for identifying a touch event on the touch interface by processing signals present on at least one of the column conductors.

22. The computer readable medium according to claim 21, wherein the first electrotactile discharge signal is generated on at least one of the first and second row conductors and is time multiplexed with at least one of the first row signal or the second row signal.

* * * * *